No. 634,725.　　　　　　　　　　　　　　　Patented Oct. 10, 1899.
C. EICKMANN & H. H. FAY.
TUBULAR TIRE FOR WHEELS.
(Application filed Feb. 6, 1899.)

(No Model.)　　　　　　　　　　　　　　　　2 Sheets—Sheet 1.

No. 634,725. Patented Oct. 10, 1899.
C. EICKMANN & H. H. FAY.
TUBULAR TIRE FOR WHEELS.
(Application filed Feb. 6, 1899.)

(No Model.) 2 Sheets—Sheet 2.

Witnesses
M. C. Buck
R. D. Hawkins

Inventors
Christian Eickmann
and Henry H. Fay
By V. H. Lockwood
Their Attorney.

UNITED STATES PATENT OFFICE.

CHRISTIAN EICKMANN AND HENRY H. FAY, OF INDIANAPOLIS, INDIANA.

TUBULAR TIRE FOR WHEELS.

SPECIFICATION forming part of Letters Patent No. 634,725, dated October 10, 1899.

Application filed February 6, 1899. Serial No. 704,699. (No model.)

*To all whom it may concern:*

Be it known that we, CHRISTIAN EICKMANN and HENRY H. FAY, of Indianapolis, county of Marion, and State of Indiana, have invented a certain new and useful Tubular-Tired Wheel; and we do hereby declare that the following is a full, clear, and exact description thereof, reference being had to the accompanying drawings, in which like numerals refer to like parts.

Our invention relates to a construction of a wheel having a pneumatic or other tubular tire.

It consists in metallic buckles of peculiar form and construction for securing together the two edges of the outer casing of such a tire, and, in the second place, in the combination therewith of a rim provided with recesses or seats to receive the outer portion or ends of the metallic buckles, whereby the tire when inflated will be held securely on the rim without glue or other means. Some of the advantages of this construction are that the outer casing can be made of a flat strip of rubber or other suitable material, with its two edges fastened together all the way around by metallic buckles, and when desired the said casing can be readily opened all the way around by merely releasing the buckles. In the second place, the tire is not secured irremovably to the rim, as when glued thereto, but can be readily removed therefrom when deflated. When inflated, the pressure of the air in the tire keeps the buckles securely seated in the notches or recesses of the rim, whereby the tire is held firmly in place and cannot turn or creep.

The nature of our invention will more fully appear from the accompanying drawings and the description and claims following.

Figure 1:
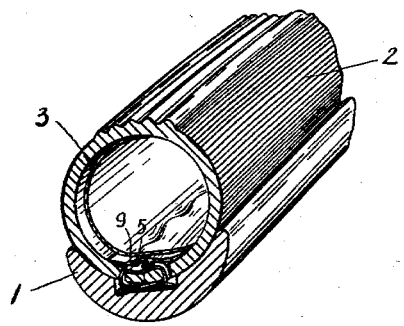
Figure 2:
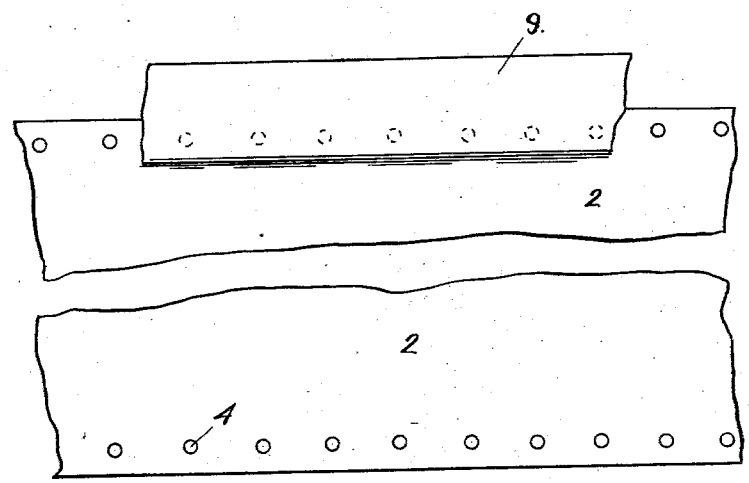
Figure 3:
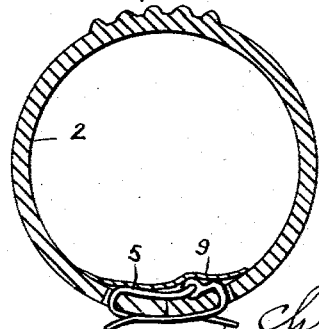
Figure 4:
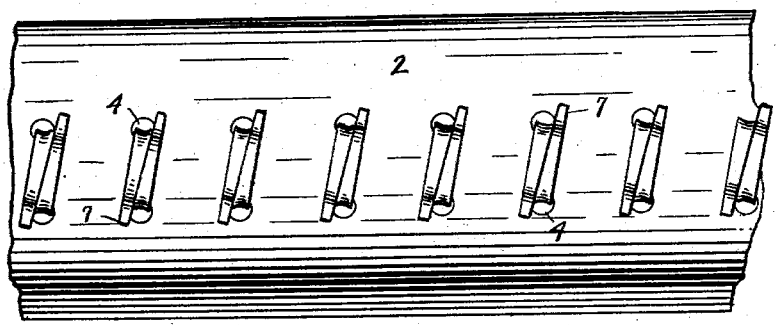
Figure 5:
Figure 6:
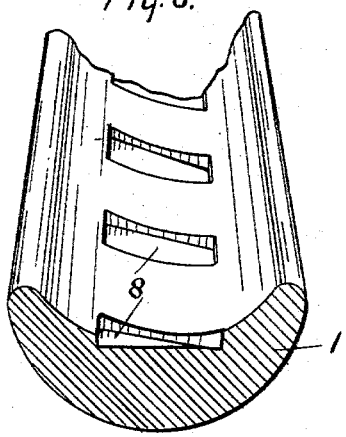

In the drawings, Figure 1 is a perspective of a section of my rim and tire. Fig. 2 is a plan of a portion of the outer casing before it is formed round and buckled together, it being centrally broken away as indicated. Fig. 3 is a central cross-section of the outer casing formed and buckled together. Fig. 4 is a plan of a portion of the outer casing formed and buckled together, the outer portion of the buckles being shown. Fig. 5 is a detail of a buckle. Fig. 6 is a perspective of a portion of the rim, showing the recesses.

In detail, 1 is the rim of a wheel, preferably made of wood.

2 is the outer casing of a pneumatic tire, and 3 is the inner tube.

There is nothing peculiar in this invention about the inner tube, it being made in the usual form.

The outer casing is made of a flat strip of rubber or other suitable material, as shown in Fig. 2. Along its two edges it is provided with suitable holes 4 to receive the metal buckles, whereby it is secured together, as is seen in Fig. 3. The buckle shown in Fig. 5 consists of two portions 5 and 6, the portion 6 being hinged or pivoted to the portion 5 to make a loose joint. The portion of the parts 5 and 6 adjacent to the hinge is curved or bent, as shown in Fig. 5, so as to conform to the curvature of the outer casing when formed into a tube, as seen in Fig. 3. The parts 5 and 6 of the buckle are then bent in a curve outward to form the parts that extend through the holes 4 of the outer casing, and then the outer or free ends 7 of the said parts 5 and 6 of the buckle are bent back, as seen in Fig. 5, so as to extend in opposite directions beside each other, as seen in Fig. 4. These ends 7 of the buckle are substantially as long as the buckle, so that when placed in the position shown in Fig. 4 any object, such as the rim, resting or pressing upon them will never fail to keep the buckles closed. The extreme ends of the buckle are turned outward somewhat, as shown in Figs. 3 and 5, for a purpose that will be explained. When the holes 4 in the outer casing are made opposite each other, as seen in Fig. 4, the ends 7 of the buckles lying side by side will extend at somewhat of an angle to a cross-section line through the outer casing.

Turning now to the rim, its inner face is provided with a series of recesses, notches, or seats 8 to receive the outer or exposed portion of the buckles. These notches are the same distance apart as the holes 4 or the buckles in the tire. The bottom of each of these recesses is made flat, so that the extreme ends of the parts 7 of the buckles will rest upon the bottom of the recesses, and when the tire is inflated the pressure on the buckles will tend to flatten the ends 7 down solidly on the bottom of the recesses 8. By reason of the extreme ends of the parts 7 of the buckles fitting snugly and tightly in the corners or deeper portions of the recesses 8 the buckles will be thereby more securely seated in said recesses. It is apparent, therefore, that when the tire is inflated the pressure against all the buckles tends to hold them firmly in place in the recesses, so that the tire can neither turn nor creep in the least. To protect the inner tube 3 from abrasion by the buckles, I secure a flap 9 by one of its edges to one of the sides or edges of the outer casing, as seen in Fig. 2. It is secured on the inside of the outer casing for the full length thereof, and the other edge of the flap 9 is entirely free for its full length.

For repair or other purposes the tire is removed by deflating it, taking it off the rim, which can be done in a second, and then the tire can be opened by rapidly releasing the buckles either for its full length or only at the place where a puncture may need attention. Whatever may be desired to be done with the parts, they can be separated quickly, the tire removed from the rim, the outer casing opened, and the inner tube removed, and likewise all can be replaced as quickly, and all without any damage to any part thereof.

What we claim as our invention, and desire to secure by Letters Patent, is—

1. A tubular-tired wheel including a rim provided with a series of recesses or notches, a tire with an outer casing, and metallic buckles connecting the meeting edges of the outer casing, said buckles formed of two parts hinged within the casing, the free ends thereof extending through said casing and turned toward each other and adapted to fit in said recesses or notches in the rim.

2. A tubular-tired wheel including a rim with a series of flat-bottomed recesses or notches, a tire having an outer casing, and metallic buckles to connect the meeting edges of said outer casing with their hinged portion within the outer casing and with arms extending outside thereof side by side in opposite directions and with their extreme ends bent outward, substantially as set forth, to fit in said recesses or notches in the rim.

3. A tubular-tired wheel including a rim provided with recesses or notches at a slight angle to a cross-section line of the rim, a tire having an outer casing with a series of holes along each edge thereof and opposite each other, and metallic buckles to secure said edges together consisting of two parts hinged with the hinge inside the outer casing and the two parts thereof extending through said holes side by side and overlapping said edges of the outer casing, said buckles being the same distance apart as the recesses or notches in the rim.

In witness whereof we have hereunto affixed our signatures in the presence of the witnesses herein named.

CHRISTIAN EICKMANN.
HENRY H. FAY.

Witnesses:
AMANDUS N. GRANT,
ROBT. D. HAWKINS.